Patented Mar. 2, 1937

2,072,250

UNITED STATES PATENT OFFICE 2,072,250

TREATMENT OF FILAMENTS, FILMS, AND SIMILAR MATERIALS CONTAINING ORGANIC DERIVATIVES OF CELLULOSE

Henry Dreyfus, London, England

No Drawing. Application March 14, 1935, Serial No. 11,077. In Great Britain March 20, 1934

8 Claims. (Cl. 8—20)

This invention relates to improvements in the treatment of cellulosic materials, and is more particularly directed to treatments of artificial materials made of or containing cellulose acetate or other organic derivative of cellulose for the purpose of obtaining products of improved strength or for the purpose of producing crêpe fabrics.

U. S. Patent No. 1,709,470 and a number of later specifications describe the stretching of artificial materials of cellulose acetate or other organic derivative of cellulose to obtain products of lower denier, with a resultant increase in their tensile strength. U. S. Patent No. 1,709,470 describes stretching in the presence of water, and states that the stretching may be facilitated by agents which swell the cellulose acetate and instances acetone, ethyl alcohol, formaldehyde and glycerine.

It has now been found that the stretching of yarns or other materials of cellulose acetate or other organic derivative of cellulose may be facilitated by subjecting the materials at superatmospheric, i. e. above room, temperatures, with or without pressure, to the action of suitable organic compounds which are non-solvents and have no substantial swelling action upon the cellulose derivative at ordinary temperatures. Such compounds will be referred to below simply as non-solvents.

As examples of non-solvents which may be employed for the purposes of the present invention may be instanced alcohols, particularly monohydric alcohols containing 3 or more carbon atoms, for example the various butyl and amyl alcohols and cyclohexanol, and hydrocarbons, especially aromatic and other cyclic hydrocarbons, for instance benzene, toluene, the xylenes, dihydrobenzene and hexa-hydrobenzene. Examples of other suitable non-solvents are naphthalene, tetra- and deca-hydro-naphthalene and nitrated aromatic hydrocarbons, e.g. nitro-naphthalene, nitro-benzene, nitro-toluene and nitro-xylene, ethers, for example iso-propyl ether, higher ketones, for example methyl-propyl and methyl-amyl ketones, and higher esters, for example normal and iso-propyl acetates. The above compounds have a softening action on organic derivatives of cellulose at increased temperatures, and are substantially insoluble in water.

The present invention particularly contemplates the employment of these agents at temperatures above 50° C. or better still above 100° C. Temperatures of 110, 120 or 130° C. up to 150, 170 or 180° C. or more may, for instance, be employed. It is desirable, however, not to employ temperatures much above 200° C. as the cellulose derivative is liable to soften too much or even to decompose when excessively high temperatures are employed. The actual maximum temperature depends upon the particular cellulose derivative which is being treated and the non-solvent employed. In general with a homologous series of non-solvent agents the higher members of the series will require a higher temperature for the treatment than the lower members.

Treatment with liquid agents may be carried out under atmospheric pressure or under pressure so as to enable them to be used at temperatures higher than their boiling point. In the form of their vapours the agents may be used at any desired pressure.

Preferably the stretching is carried out while the artificial materials remain in contact with the medium containing the non-solvent. The stretch may be of quite a low order, for example a stretch so as to produce a permanent elongation of about 30–70% of the original length of the materials, this process being particularly valuable for the manufacture of materials of medium tensile strength and for the manufacture of crêpe fabrics; or very considerable stretches may be applied as, for example, stretches of over 100% and up to 500, 700 or more per cent. of the original length of the materials. In order to achieve these higher stretches higher temperatures and/or higher pressures are in general requisite.

Where the agents used in accordance with the present invention are employed in the vapour state, it is preferable that the vapours should be wet or just saturated. Thus, the vapours are preferably applied at a temperature corresponding to or slightly below the boiling point of the particular agent at the pressure obtaining. The invention does not however exclude the use of vapours entirely free from condensate.

The invention further includes facilitating stretching by means of the special agents of the present invention in conjunction with water or steam. Thus, for example, mixtures of water and alcohols may be employed within the limits of their miscibility, or mixtures of steam with vapours of any of the agents referred to above. Alternatively hot water or steam may be used at one stage of stretching in accordance with the invention and the special agents of the invention in another stage of stretching.

As previously indicated, yarns stretched in accordance with the present invention are particularly suitable for the manufacture of crêpe fabrics. The stretching may be carried out upon the yarns before the insertion of the crêpe twist or alternatively the yarn already twisted to the degree necessary for producing the crêpe effect may be stretched in the presence of the agent, for example in a winding operation from bobbin to pirn or in a bobbin to bobbin winding operation. Yarns treated according to the present invention may be continuous filament yarns or spun yarns made from staple fibre. Moreover they may contain finely divided insoluble compounds, e. g. titanium dioxide, barium sulphate or other substances which modify their lustre, or weighting agents, e. g. tin compounds.

The stretching may be carried out on the materials under any suitable conditions, and generally the materials may be untwisted or twisted. The stretching operation of the present invention may be applied to a single thread or bundle of filaments proceeding, for example, from a spinning machine or from a cheese or bobbin, or a number of threads or bundles of filaments may be stretched in a single apparatus. Thus, a number of bundles of filaments from a spinning machine or a number of threads from a creel of bobbins may be passed through a vessel where they are subjected to the action of a liquid or vaporous reagent and stretched, and may then be wound with or without twisting or further twisting. Each thread or bundle of filaments may be wound separately, or, if desired, a number of threads or bundles may be associated together to form a single thread.

The stretching operation may be carried out in a single stage or it may be effected in a number of stages, with or without the insertion of rest periods between two or more of the stages. U. S. application S. No. 573,424 filed 6th November 1931 describes methods of carrying out such stretching operations on materials containing cellulose esters or ethers in which the tension is removed between at least two of the stages, and the methods disclosed therein may be applied to the materials treated according to the present invention.

Films, foils and similar materials may be treated in accordance with the present invention and the stretching may be effected longitudinally and/or laterally, or a lateral tension sufficient only to prevent any lateral shrinkage or substantial shrinkage may be applied in conjunction with a longitudinal stretch. The apparatus described in U. S. application S. Nos. 666,655 filed 18th April 1933, and 666,656 filed 18th April 1933, in connection with the stretching of materials containing cellulose derivatives may also be employed in the treatment of materials according to the present invention.

When the treatment of the present invention is effected continuously with the production of the artificial materials it may be carried out in an apparatus which forms part of or is directly connected with a spinning machine or in one which is separate therefrom. For a description of apparatus which may be employed in carrying out the processes of the present invention reference is made to U. S. applications S. Nos. 4,510 filed 1st February 1935, and 4,511 filed 1st February 1935.

The following examples are given in order to illustrate the invention, but are not to be considered as limiting it in any way:—

Example 1

A number of cellulose acetate artificial threads supplied, for example, from a creel of bobbins are passed from a feed device through a vessel containing the vapours given off at the boiling point by the constant boiling mixture of normal butyl alcohol and water (which boils at about 92° C. at atmospheric pressure). The threads, while passing through the vessel, are stretched by passing them in contact with rollers or the like rotating at a peripheral speed greater than that of the feed device, such rollers being positioned either inside or outside the vessel. From the rollers the threads pass to a drying apparatus and are then taken up on bobbins or in any other suitable manner. By conducting the operation at atmospheric pressure or slightly higher pressures low degrees of stretch may be produced. For higher degrees of stretch, higher pressures should be used.

Example 2

Cellulose acetate spun yarn is stretched during its passage through a suitable vessel containing the saturated vapour of di-isopropyl ether at a temperature of about 100–110° C. and at the corresponding pressure.

Example 3

A number of cellulose acetate yarns supplied from a creel of bobbins are passed in parallel formation in the form of a sheet through a vessel containing nitro-benzene at a temperature of 80–90° C., and are stretched while in contact with the liquid. After stretching the nitro-benzene may be removed by heat or by washing the materials with a suitable solvent for nitro-benzene.

Example 4

Cellulose acetate yarns are treated in a similar manner to that described in the preceding example except that naphthalene at a temperature of about 125° C. is employed.

The stretched materials may be subjected to any desired after-treatment processes. Thus, they may be treated with shrinking agents in order to improve their extensibility, or they may be subjected to delustring operations, for example by incorporating therein finely divided organic or inorganic materials. Again, materials containing saponifiable groups may be saponified in order to remove or partially remove such groups.

The products of the present invention may be associated with other materials, e. g. with yarns of cellulose acetate or other organic derivatives of cellulose which have been stretched, or with viscose or other regenerated cellulose, cotton, wool or other textile material to form mixed yarns, fabrics and the like exhibiting special effects.

While the invention is more particularly valuable in relation to the treatment of materials made of or containing cellulose acetate, and especially acetone-soluble cellulose acetate, it may be applied to the treatment of materials made of or containing other cellulose esters, for example cellulose propionate, butryrate, nitro-acetate and the like, or made of or containing cellulose ethers, for example ethyl, propyl or benzyl celluloses. It further includes the treatment of cellulose ester materials which have been partially and uniformly or substantially uniformly saponified, for example by means of caustic soda or other strong saponifying agent in an alcoholic medium, or with monomethylamine, ethylene diamine or other organic bases having a similar effect.

What I claim and desire to secure by Letters Patent is:—

1. In a process for stretching artificial filaments, threads, yarns, foils, films and similar materials containing organic derivatives of cellulose, the step of swelling the materials by treatment at above room temperature with a water-insoluble organic compound which, at room temperature, has no substantial swelling action thereon.

2. In a process for stretching artificial filaments, threads, yarns, foils, films and similar materials containing cellulose acetate, the step of swelling the materials by treatment at above room temperature with a water-insoluble organic compound which, at room temperature, has no substantial swelling action thereon.

3. In a process for stretching artificial filaments, threads, yarns, foils, films and similar materials containing organic derivatives of cellulose, the step of swelling the materials by treatment at a temperature above 100° C. with a water-insoluble organic compound which, at room temperature, has no substantial swelling action thereon.

4. In a process for stretching artificial filaments, threads, yarns, foils, films and similar materials containing organic derivatives of cellulose, the step of swelling the materials by treatment at a temperature above 50° C. with the wet vapor of a water-insoluble organic compound which, at room temperature, has no substantial swelling action thereon.

5. In a process for stretching artificial filaments, threads, yarns, foils, films and similar materials containing organic derivatives of cellulose, the step of swelling the materials by treatment at a temperature above 100° C. with a water-insoluble alcohol which, at room temperature, has no substantial swelling action thereon.

6. In a process for stretching artificial filaments, threads, yarns, foils, films and similar materials containing organic derivatives of cellulose, the step of swelling the materials by treatment at a temperature above 100° C. with a water-insoluble ether which, at room temperature, has no substantial swelling action thereon.

7. In a process for stretching artificial filaments, threads, yarns, foils, films and similar materials containing organic derivatives of cellulose, the step of swelling the materials by treatment at a temperature above 100° C. with a water-insoluble aromatic hydrocarbon which, at room temperature, has no substantial swelling action thereon.

8. In a process for stretching artificial filaments, threads, yarns, foils, films and similar materials containing organic derivatives of cellulose, the step of swelling the materials by treatment at a temperature above 50° C. with a medium containing water vapor and the vapor of a water-insoluble organic compound which, at room temperature, has no substantial swelling action thereon.

HENRY DREYFUS.